United States Patent Office 3,504,216
Patented Mar. 31, 1970

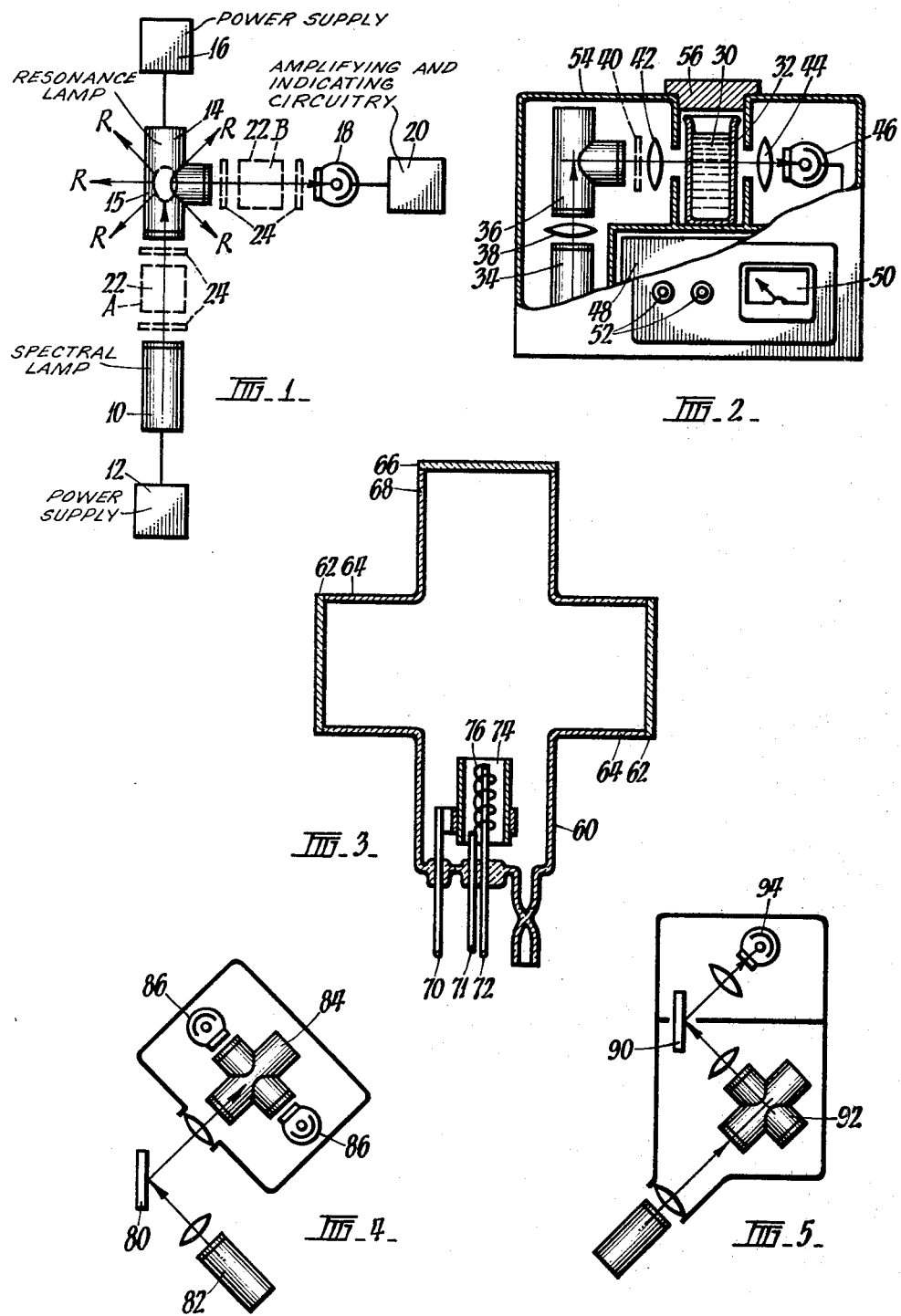

3,504,216
RESONANCE LAMP FOR ATOMIC ABSORPTION SPECTROSCOPY
Alan Walsh, Brighton, Victoria, and John Vincent Sullivan, Carnegie, Victoria, Australia, assignors to Commonwealth Scientific and Industrial Research Organization, East Melbourne, Victoria, Australia, a body corporate
Filed May 31, 1966, Ser. No. 553,781
Claims priority, application Australia, May 28, 1965, 59,465/65, 59,466/65
Int. Cl. G01j *3/42;* G01n *21/00;* H01j *17/04*
U.S. Cl. 313—209                               1 Claim

ABSTRACT OF THE DISCLOSURE

A thermal resonance lamp for use in atomic absorption spectroscopy wherein said lamp is provided with a side arm perpendicular to the main portion of the lamp for allowing re-emitted radiation to be directed out of said lamp.

---

This invention relates to a new technique for measuring the absorption of substances as specific wave lengths of the electromagnetic radiation spectrum. Such measurements can be of use in colorimetry and related techniques, but are of particular value in the quantitative analysis of solutions of chemical substances by spectrophotometric measurement at specific wavelengths.

Know spectrophotometers include a source of "light" (herein used to include infrared, visible or ultraviolet radiation), means for selecting a narrow band of spectral wave lengths from the light radiation emitted by the source, and means for directing the selected radiation as a beam through the sample and on to a detector (usually a photoelectric detector although photographic detectors are often used). Sophisticated instruments of this type employ complex and expensive, continuously-variable monochromators to isolate any selected narrow wave length band of the spectrum emitted by the light source. Such instruments can be used to plot the entire absorption spectrum of a sample over a given wave length range for qualitative purposes, as well as to quantitively and accurately measure the absorption by the sample at a given nominal wave length and hence determine the concentration of this substance.

The visible and ultraviolet absorption spectra of most chemical compounds show at least one characteristic "absorption maximum" i.e. a region of the spectrum about a certain nominal wave length where the absorption is at a maximum. Because of this phenomenon it is possible to make quantitative absorption measurements at or near the absorption maximum of a given compound to determine the concentration of that compound even in the presence of other compounds in the sample.

For compounds or substances with known absorption maxima, and when only quantitative absorption measurements at a single characteristic wave length are required, instruments having continuously variable monochromators are unnecessary and other more simple (but often less accurate) instruments may be used which employ a series of filters to filter out unwanted wavelengths from the light source and thus produce a more or less narrow band of wave lengths for the absorption measurement. This latter type of instrument finds numerous applications where routine spectrophotometric assays are to be carried out especially by unskilled or semi-skilled workers. These simple instruments can be considerably improved by replacing the usual optical absorption filters with so-called interference filters which give much narrower bands of wave lengths. In the visible region, interference filters can produce almost monochromatic light comparable, in fact, with that obtained from some conventional monochromators. In the ultraviolet region however, interference filters are far less satisfactory for the production of monochromatic or near monochromatic ultraviolet radiation.

The present invention therefore seeks to provide a simple and reliable instrument and method for spectrophotometric measurement at certain specific and very narrow wave length bands without the need for elaborate monochromatic filter systems.

Accordingly, the present invention provides a method for the spectrophotometric or colorimetric measurement of the absorption of light radiation by a substance at or near a specific nominal wave length, said method including the steps of: generating light which contains radiation at said wave length, generating an atomic vapour or gas of an element having a resonance line at said wave length directing said radiation onto said vapour or gas and detecting the intensity of resonance radiation re-emitted thereby, and arranging said substance in the path of the radiation.

More particularly, but not essentially, the invention provides a spectrophotometric method for measuring the absorption of a chemical compound dissolved or suspended in a sample medium, which method includes the steps of: generating a beam of light which contains radiation at a nominal wave length at or near an absorption maxima of the compound concerned, said wave length also being the nominal wave length of a resonance spectral line of a chemical element; generating an atomic vapour or gas of said element; directing said radiation at said atomic vapour or gas to cause the vapour or gas to re-emit resonance radiation; arranging the compound in the path of the radiation; and measuring the intensity of the resonance radiation re-emitted by said vapour or gas so that the degree of attenuation of the resonance line due to the substance can be determined.

The invention is also concerned with apparatus for use in spectrophotometric measurements on substances at a specific wave length, the apparatus including: a spectral lamp for generating light radiation including a spectral line at the specific wave length, means for holding a prepared sample of said substance, a resonance lamp for generating a vapour or gas of an element having a resonance line at the wave length, and photoelectric detector means associated with said resonance lamp to detect the intensity of radiation emanating therefrom; the arrangement being such that, when the apparatus is in use, light radiation is directed from the spectral lamp onto the atomic vapour or gas in the resonance lamp and resonance radiation re-emitted from said atomic vapour or gas is directed to said photoelectric detector means, the prepared sample of the substance being interposed in the radiation path between the spectral lamp and the photoelectric detector means.

The term "resonance line," when used herein in association with a given chemical element, is intended to indicate any atomic spectral line characteristic of that element which, under suitable conditions, is absorbed and subsequently re-radiated by atoms of that element (usually after a delay of approximately $10^{-8}$ seconds). It will be appreciated that, although most elements have a large number of spectral lines, few have many more than one resonance line. However, where elements having more than one resonance line are employed for the purposes of the invention, it is likely that only one of the resonance lines will be of interest so that, in such cases, filters can be used to prevent radiation at the wave lengths of the unwanted lines from reaching the photodetector.

Simple optical filters will usually be adequate for this purpose. Reference in this specification to a chemical element is, of course, intended to include reference to any isotope of that element. Finally, as mentioned previously, the term "light radiation" is intended to indicate any radiation in the areas of the electromagnetic spectrum commonly referred to as the infrared, visible and ultraviolet regions of the spectrum.

Where, in this specification, the method of the invention is defined by listing a number of steps, it should also be appreciated that this is done only to name the essential steps rather than to imply any particular sequence in which the steps must be performed. For example, the substance under investigation can be arranged in the radiation path either before or after the radiation or atomic vapour is actually generated.

Preferably, the sample compound or substance to be investigated is prepared by dissolving it or suspending it in a suitable substantially transparent solvent or medium in any one of the ways commonly employed in the art. However, the techniques of the invention have possible, though less useful, application to the measurement of the reflectivity of a solid substance at specific wave lengths. Nevertheless, with either type of measurement, the sample may be placed before or after the resonance lamp in the direction of the radiation.

Since efficient resonance radiation can best occur from relatively low temperature gases or vapours at reduced pressures, it is preferable, according to this invention, to generate the gas or vapour within a partially evacuated resonance lamp by electrical means—that is, either by an electrical discharge which gives rise to cathodic sputtering or by electrically heating a body of the element concerned. Specifically, it is preferable to employ a resonance lamp of the type described in our co-pending patent application No. 372,772 and, similarly, to employ the type of atomic spectral lamp disclosed in our patent applications Nos. 314,350, now abandoned and 451,206, now Patent No. 3,305,746.

In order to further portray the nature of the present invention, various examples of its practical application will now be described by way of illustration only. In the following description reference will be made to the accompanying drawings in which:

FIGURE 1 is a general schematic layout showing the components typically required for the performance of the invention. FIGURE 2 is a sectional elevation of one form of spectrophotometer suitable for use in the analysis of protein solutions. FIGURE 3 is a longitudinal section of one form of thermal resonance lamp which can be employed in the performance of the present invention. FIGURES 4 and 5 illustrate different possible applications of the principles of the invention to colorimetric measurements at specific wave lengths on the surfaces of solid substances.

Referring now to FIGURE 1 of the accompanying drawings, it will be seen that the principal components required for the performance of the invention simply comprise a spectral lamp 10 and its associated electrical power supply 12, a resonance lamp 14 and its associated power supply 16, and a photoelectric cell or photomultiplier tube 18 and its associated amplifying and indicating circuitry 20. The sample medium 22 (indicated by broken lines) can, as previously indicated, be placed in either position A or position B—before or after the resonance lamp 14 respectively. If it is desired to block unwanted light from the spectral lamp 10, or unwanted resonance lines from the resonance lamp 14, filters 24 may be placed in various positions either before or behind the sample medium 22 as indicated.

In operation, an element is selected having a strong resonance line close to the nominal wave length at which the measurement is to be performed and the appropriate spectral lamp 10 and resonance lamp 14 are selected. The spectral lamp, powered by supply 12, emits the full atomic spectrum of the selected element including the desired resonance line, this radiation being first directed through or onto any sample 22 in position A and then onto the cloud of vapour within the resonance lamp 14. Resonance radiation at each of the few resonance lines for the element (including that at the selected wave length) is emitted in all directions from the vapour as shown by the arrows R. Some of this resonance radiation passes through the side arm and window of lamp 14 and is directed through or onto the sample 22 if it is in position B, and any resonance lines other than the desired one are blocked by filters 24 so that only the selected resonance line at the chosen frequency reaches the photocell 18. The output of the photocell is amplified and passed to a suitable meter to indicate percentage transmission. The instrument is calibrated by similar measurements of the transmission of one or more reference samples.

The choice of sample and filter positions will usually depend upon fairly obvious considerations. For example, if a photosensitive sample is employed, it will be better to place it after the resonance lamp and any filters employed should be placed in front of the sample so that the minimum amount of light will pass through or onto the sample. On the other hand, if the sample is fluorescent it will be preferable to place it in position A so that its fluorescent radiation will not reach the photocell 18. If ambient light leakage to the photocell is a problem, position A may be preferred and the effects of any such leakage could be greatly reduced by modulating the output of the spectral lamp 10 and employing some form of synchronous detector within the amplification and indication circuitry 20. The sample and filter positions also depend upon the particular resonance line chosen and the atomic energy levels of the corresponding element, as is illustrated by the cases of thallium and magnesium described below.

Preferably, simple focusing lenses are employed to direct the radiation from the spectral lamp on to the cloud of vapour in the resonance lamp 14 and to direct the resonance radiation onto the sensing element of the photocell 18. Finally, it will be noted that the use of position B for the sample would allow the resonance lamp 14 and the atomic spectral lamp 10 to be made in the one envelope.

To take an important and specific practical application of the principles of the invention, consider the need to determine protein concentrations often encountered in biochemical laboratories. FIGURE 2 illustrates a simple robust instrument suitable for this purpose in which the sample solution 30 is contained in a sample tube 32 which is, effectively, placed in position B of FIGURE 1. The spectral lamp 34 in this case is mounted immediately adjacent and coaxial with the resonance lamp 36 except for the interposition of a simple focusing lens 38 that serves to focus the radiation from the spectral lamp 34 onto the vapour cloud in the resonance lamp 36. A filter 40, indicated by broken lines, may be inserted immediately adjacent the output arm of the resonance lamp 36 as indicated and a simple lens system comprising lenses 42 and 44 is employed to focus the resonance radiation from the resonance lamp 36 through the sample tube 30 and thence onto the sensitive area of the photocell 46. The power supply for the spectral lamp 34 and the resonance lamp 36, together with the amplifcation and indication circuitry associated with the photocell 46, is contained in a single electronic unit 48 provided with a simple output meter 50 which indicates the amount of light received by the cell 46 and with various controls 52. Of course, provision can be made for remote indication or recording of the results of any given measurement. As shown in FIGURE 2, the entire apparatus can be contained in a simple compartmented housing 54 provided with a light-tight lid 56 for the compartment within which the sample 32 is placed.

Provision may be made, as in conventional spectrophotometers, for alternating the cell containing the protein solution with a "blank" tube filled with a standard solution or solvent and comparing the responses of the instrument for each tube. Alternatively, the instrument can be arranged as a double-beam instrument with appropriate beam splitting and comparison devices of known types. Furthermore, and as suggested above, the output of the spectral lamp may be modulated in any known way to reduce DC drift errors in the detector circuitry and to eliminate the effects of unwanted light in the system.

It is well known from previous spectrophotometric investigations that proteins show a characteristic absorption at the ultraviolet end of the visible spectrum between 2700 and 2900 A., usually with a maximum absorption at about 2800 A. Such ultraviolet absorption by proteins and nucleic acids is attributed to certain aromatic amin acids, purines and pyrimidines contained in these substances although the protein absorption peak at 2800 angstrom has been attributed chiefly to tyrosine and tyrotophane each of which shows three bands in the vicinity of 2700 to 2900 A. Thus, it is only the broad absorption band near 2800 A. that is satisfactory for the quantitative estimation of protein concentration; and consequently the instrument shown in FIGURE 2 must operate within this specific absorption band.

Now, the atomic spectrum of the element thallium has a strong resonance line at 2768 A. (more accurately 2767.87 A.), and the element magnesium has a strong resonance line at 2852 A. Instruments of the types illustrated in FIGURE 1 or 2 which employ a thallium spectral lamp with a thallium resonance lamp, or a magnesium spectrum lamp with a magnesium resonance lamp, have been found to be capable of providing simply and elegantly precise indications of protein concentrations.

If the thallium system is preferred, it is important to note that absorption of the thallium line at 2768 A. gives rise to lines at 2768 A. and at 3519 A., in the resonance radiation, whilst absorption of the thallium line at 3776 A. gives rise to lines at 3776 A. and at 5350 A. Thus it is important in this case to put sample cell in position A, together with an absorption filter which transmits the 2768 A. line but not the line at 3776 A. The resonance radiation is then due entirely to absorption of the 2768 A. line. Thus, if the arrangement of FIGURE 2 is employed (that is if position B for the sample is chosen) the line at 3519 A. should be filtered out from the 2768 A. line at some point between the resonance lamp and the photocell so that only the line at 2768 A. is able to reach the photocell.

If, on the other hand, magnesium spectral lamps and resonance lamps are employed the above complication does not arise as magnesium has only a single resonance line at 2852 A. Thus, the arrangement of FIGURE 2 is better suited to a magnesium system than it is to a thallium system and it has been found that the results of the magnesium system are, in general, entirely satisfactory.

It will be appreciated that, since radiation of the ultraviolet region is being used, the windows provided on the spectral lamps and the resonance lamps as well as the material of the sample tube, lenses and filters should be transparent to this radiation. It has been found that quartz glass is suitable for use in the lenses and windows.

Suitable spectral lamps and suitable resonance lamps employing cathodic sputtering are known or have been described in our co-pending patent applications. A typical example of a simple form of thermal resonance lamp is therefore illustrated in FIGURE 3. It simply consists of a cruciform normal glass envelope 60 fitted with vacuum-tight windows 62 on its two side arms 64 and a similar quartz glass window 66 at one end of the main tube or arm 68. At the other end of the main tube or arm 68, wire supports or electrodes 70, 71 and 72 are inserted by means of glass-to-metal seals through the closed end of this arm. Wire support 70 mounts a hollow tube 74 of a chemical element within which a heater filament 76 is centrally arranged and supported by its electrodes 71 and 72.

Tubes 74 formed from elements having low mechanical strength may be secured inside an outer supporting tube of different material while relatively volatile elements may be supported in a cup or boat formed from such material. When electric current is passed through the filament 76 the tube 74 is heated and gives off a vapour or gas of the chemical element concerned which forms a cloud near the centre of the envelope 60. Rapid dispersion and condensation of this vapour on the walls of the envelope 60 is prevented by employing an inert gas fill (such as neon or argon) at a pressure of about 3 mm. of mercury, this pressure being insufficient to inhibit the resonance effect. Finally, although, as shown in FIGURES 1 and 2, it is often necessary only to have one side arm 64 on such resonance lamps, two side arms as indicated in FIGURE 3 can be employed where two photocells are desirable or where, as envisaged by the present invention, a vapour of more than one chemical element is formed and separate detectors and filters are required. On the other hand, even where one photocell is employed, two side arms can be beneficial as the "unused" arm greatly reduces the amount of reflected light received by the cell.

Referring now to FIGURES 4 and 5 of the accompanying drawings, it will be seen that the principles of the present invention can be applied to colorimetric measurements of surfaces by reflection of light at the specific wave length concerned. In FIGURE 4 the sample 80 is arranged between the spectral lamp 82 and the resonance lamp 84, and two photocells 86 are employed as detectors. In FIGURE 5 the sample 90 is arranged between the resonance lamp 92 and a single photocell 94. Suitable lenses and filters can again be used where desired and care should again be taken to avoid the admission of ambient light to the photocell.

It will be seen, therefore, that an inherently accurate, simple and robust spectrophotometric method has been provided by the present invention. However, those skilled in the art will appreciate that many minor modifications can be made to the method and apparatus of the invention without departing from the principles thereof. Such modifications include the use of multiple element spectral sources and corresponding multiple resonance lamp and detector combinations. In this manner somewhat more versatile instruments can be provided and measurements on more than one substance may be performed simultaneously or successively. The technique can, of course, be applied to other substances as it is only necessary to determine the wave length of specific interest and to select an element for use in the spectral and resonance lamps having a resonance line at or near the wave length concerned. Thus, the concentration of many absorbing species may be measured by the techniques we have described in solid, liquid or gaseous samples by employing the appropriate type of sample cell. Finally, light sources—such as continuous light sources—other than spectral lamps may be employed and resonance lamps other than those indicated may also be used if desired.

What we claim is:

1. A thermal resonance lamp for selectively emitting the resonance spectral line or lines, characteristic of a given chemical element, comprising a hermetically sealed envelope containing a rare gas at low pressure, a first window in said envelope transparent to radiation at the wave length of said resonant spectral line or lines, vapor generating means mounted within said envelope opposite said first window, said vapor generating means comprising a hollow cylindrical tube formed, at least in part, from the given chemical element and having an axis extending along a straight line joining said first window and said vapor generating means, and heater means disposed within said hollow tube, for heating said hollow tube a tubular side arm extending outwardly from and disposed in communication with the interior of said envelope adjacent said vapor generating means, said side arm having a longitudinal axis orthogonal to said straight line joining said first window and said vapor generating means, and a second window in the end of said side arm remote from said envelope also transparent to radiation at the wave length of said resonant spectral line or lines.

References Cited

UNITED STATES PATENTS

| | | |
|---|---|---|
| 2,847,899 | 8/1958 | Walsh. |
| 3,286,119 | 11/1966 | Sugawara et al. __ 313—185 X |
| 3,381,571 | 5/1968 | Vallee et al. |

FOREIGN PATENTS

| | | |
|---|---|---|
| 1,151,325 | 7/1963 | Germany. |
| 1,400,770 | 4/1965 | France. |

OTHER REFERENCES

David: "Recent Developments in Atomic Absorption Analysis," Spectrochimica Acta, volume 20, 1964, pages 1185–1195.

RONALD L. WIBERT, Primary Examiner

F. L. EVANS, Assistant Examiner

U.S. Cl. X.R.

250—43.5, 83.3, 218, 226; 313—224; 356—51, 96, 186